United States Patent
Reuter et al.

(10) Patent No.: US 7,366,868 B2
(45) Date of Patent: *Apr. 29, 2008

(54) GENERATING UPDATED VIRTUAL DISKS USING DISTRIBUTED MAPPING TABLES ACCESSIBLE BY MAPPING AGENTS AND MANAGED BY A CENTRALIZED CONTROLLER

(75) Inventors: James M. Reuter, Colorado Springs, CO (US); David W. Thiel, Colorado Springs, CO (US); Richard F. Wrenn, Colorado Springs, CO (US); Robert G. Bean, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 271 days.

This patent is subject to a terminal disclaimer.

(21) Appl. No.: 11/149,850

(22) Filed: Jun. 10, 2005

(65) Prior Publication Data

US 2005/0228961 A1 Oct. 13, 2005

(51) Int. Cl.
*G06F 13/00* (2006.01)
*G06F 12/00* (2006.01)

(52) U.S. Cl. ........................ 711/203; 711/103; 711/200; 709/217

(58) Field of Classification Search ................ 711/100, 711/111, 112, 154, 200, 203, 103; 709/217, 709/246
See application file for complete search history.

(56) References Cited

U.S. PATENT DOCUMENTS 5,535,381 A * 7/1996 Kopper ........................ 710/52

6,101,585 A * 8/2000 Brown et al. ................ 711/162
6,311,193 B1 * 10/2001 Sekido ........................ 707/202

OTHER PUBLICATIONS

Montague, Robert M. et al., Virtualizing the SAN, Morgan Keegan & Company, Inc., Jul. 5, 2000, pp. 1-20.
Compaq TechNote for SCO UNIX—Disk Mirroring with VERITAS VxMirror, Dec. 1992, part No. 145656-001.

* cited by examiner

*Primary Examiner*—Tuan V. Thai
(74) *Attorney, Agent, or Firm*—Drinker, Biddle & Reath, LLP.

(57) ABSTRACT

The present invention provides a method for copying data through a virtualized storage system using distributed table driven (I/O) mapping. In a system having a virtual disk (the "original disk"), a persistent mapping table for this virtual disk exists on a controller, and volatile copies of some or all entries in this mapping table are distributed to one or more more mapping agents. The method of the present invention creates a new virtual disk mapping table that has the exact same entries as the mapping table as the original virtual disk. The new snapshot disk then shares the same storage as the original disk, so it is space efficient. Furthermore, creating new snapshot disk involves only copying the contents of the mapping table, not moving data, so the creation is fast. In order to allow multiple virtual disks to share storage segments, writes to either the original virtual disk or the snapshot copy cannot be seen by the other. Therefore, in addition to simply copying the mapping table, both the original and snapshot disk mapping table must also cause writes to these disks to be handled specially. Finally, any changes to the original disk mapping table stored in the controller must be coordinated with the volatile copies stored in the mapping agent in such a way so that all hosts see a consistent view of that disk.

12 Claims, 7 Drawing Sheets

GENERATING UPDATED VIRTUAL DISKS USING DISTRIBUTED MAPPING TABLES ACCESSIBLE BY MAPPING AGENTS AND MANAGED BY A CENTRALIZED CONTROLLER

This application claims the benefit of U.S. patent application Ser. No. 09/872,597, filed on Jun. 1, 2001, which claims priority from U.S. Provisional Application Nos. 60/209,109 and 60/209,326, filed on Jun. 2, 2000, the disclosures of which are hereby incorporated by reference in full.

FIELD OF THE INVENTION

The present invention relates to a method to make fast, space efficient copies of virtual disk volumes within a distributed, table-driven virtual storage system.

BACKGROUND

The ability to duplicate and store the contents of a storage device is important in a storage system. Data may be stored in parallel to safeguard against the failure of a single storage device. Upon a failure of the first storage device, the system may then retrieve an archived copy of the data contained at a second storage device. The ability to duplicate and store the contents of the storage device also allows the creation of a fixed record of contents at the time of duplication. This feature allows users to recover a prior version of inadvertently edited or erased data.

There are generally space and processing costs associated with copying and storing the contents of a storage device. For example, the storage device cannot accept input/output (I/O) operation while its contents are being copied. Furthermore, the storage space used to keep the copy cannot be used for other storage needs and should therefore be minimized.

Known storage systems and storage software products can provide ways to make point-in-time copies of disk volumes. In some of these products, the copies may be made very quickly, without significantly disturbing applications using the disk volumes. In other products, the copies may be made space efficient by sharing storage instead of copying all the disk volume data.

However, known methodologies for copying data files are flawed. Some of the known disk copy methods do not provide fast copies. Other known disk copy methods solutions are not space efficient, wasting valuable storage space. Still other known disk copy methods provide fast and space-efficient snapshots, but do not do so in a scaleable, distributed, table-driven virtual storage system.

As a result, there exists a current need for a fast, space efficient method to copy the contents of a storage device. There is further need for a disk copy method that provides fast and space efficient copies in a distributed, virtual storage architecture to support large enterprises and to offer high scalability.

SUMMARY

In response to these and other needs, the present invention provides a method for copying data through a virtualized storage system using distributed table driven I/O mapping. Assuming the prior existence of a virtual disk (the "original disk"), a persistent mapping table for this virtual disk exists on a controller, and volatile copies of some or all entries in this mapping table are distributed to one or more mapping agents. The method disclosed herein provides a process for creating a new virtual disk that is a fast, space-efficient copy of the original virtual disk (i.e. a "snapshot disk").

At the highest level of abstraction, the process of creating a snapshot disk simply involves creating a new virtual disk mapping table that has the exact same entries as the mapping table as the original virtual disk. The new snapshot disk then shares the same storage as the original disk, so it is space efficient. Furthermore, creating a new snapshot disk involves only copying the contents of the mapping table, not moving data, so the creation is fast.

In order to allow multiple virtual disks to share storage segments, write operations to either the original virtual disk or the snapshot copy cannot be seen by the other. Therefore, in addition to copying the mapping table, both the original and snapshot disk mapping tables must also cause writes to these disks to be distinctly handled. Finally, any changes to the original disk mapping table stored in the controller must be coordinated with the volatile copies stored in the mapping agent in such a way so that all hosts see a consistent view of that disk. A host is a device in communication with a mapping agent and wherein the mapping agent may, or may not, reside. The present invention further includes new command/response operations to allow consistent copies across multiple virtual disks.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

Figure 1A:
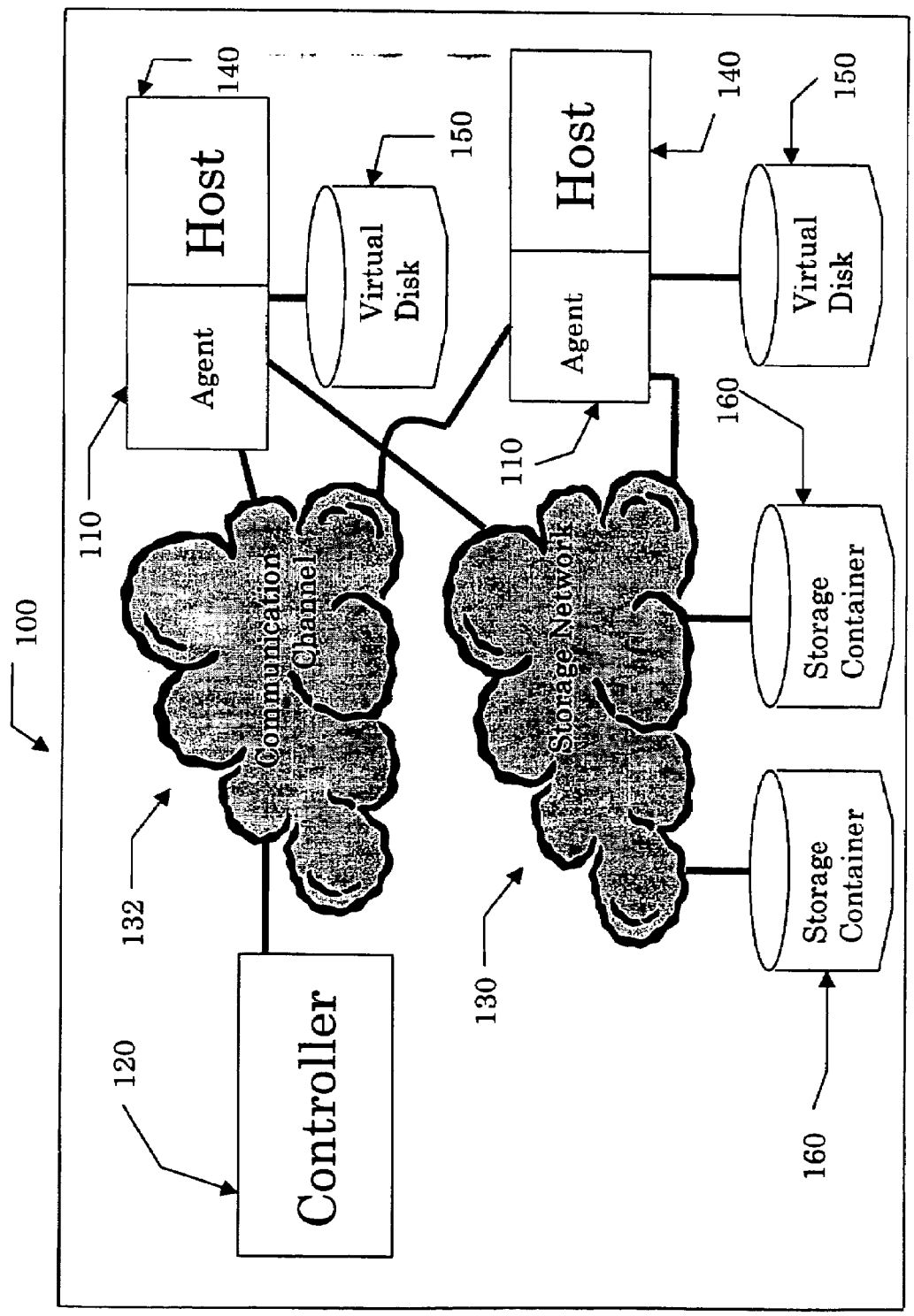
FIGS. 1A and 1B are schematic illustrations of a distributed virtual storage network.
Figure 1B:
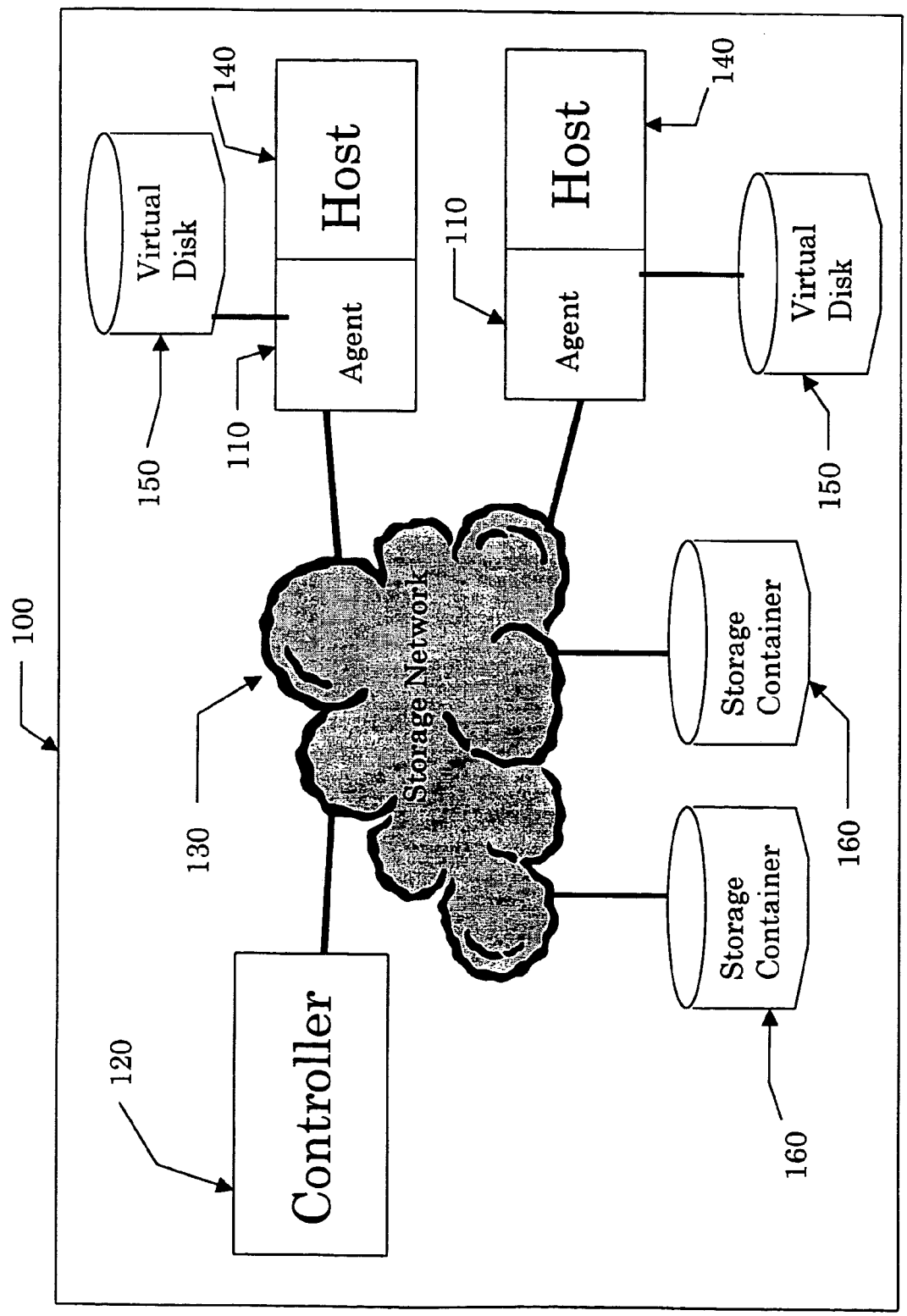

The present invention applies to a virtualized storage area network (SAN) system 100 using one or more distributed mapping tables 200, as needed to form one or more virtual disks for input/output (I/O) operations between hosts and storage containers 160, as illustrated in FIGS. 1A and 1B. In particular, the table 200 contains a mapping that relates a position in a virtual disk 150 with an actual location on the storage containers 160. The specific contents of the table 200 are described in greater detail below.

The system 100 principles of distributed, virtual table mapping can be applied to any known storage network 130. It should therefore be appreciated that the storage containers 160 are known technologies and may refer to any type of present or future known programmable digital storage medium, including but not limited to disk and tape drives, writeable optical drives, etc. Similarly, the hosts 140 may be any devices, such as a computer, printer, etc. that connect to a network to access data from a storage container 160.

Likewise, the storage network 130 is also intended to include any communication technology, either currently known or developed in the future, such as the various implementations of Small Computer Systems Interface (SCSI) or Fibre Channel. This distributed virtualization is most useful in environments where a large amount of storage is available and connected using some sort of infrastructure. One preferred implementation uses Switched Fibre-Channel connected storage. However, nothing in the design of the system 100 precludes its use on other types of storage networks 130, including storage networks that are not yet invented.

The system 100 uses multiple agents 110 that are associated with the hosts 140. The hosts 140 access the table 200 through the mapping agents 110. Preferably, each host has a separate agent 110, but the system 100 could be easily configured so that more than one host 140 connects to an agent 110. If multiple hosts 140 connect to the same agent 110, the hosts 140 concurrently access that agent's mapping table 200. Alternatively, a separate mapping table 200 may be provided for each host 140. The agent 110 stores the mapping table 200 in volatile memory such as DRAM. As a result, if one of the agents 110 loses power, that agent 110 loses its copy of the table 200. Such an event could take place if the mapping agent 110 is embedded in the host 140, for example, a backplane card serving as the mapping agent 110, and the host 140 system loses power.

By storing the mapping table 200 in volatile memory, the table 200 can be easily and rapidly accessed and modified on the agents 110. Storing the mapping table 200 in volatile memory has the further advantage of substantially reducing the cost and complexity of implementing the agents 110 as mapping agents. Overall, the agents 110 allow the performance-sensitive mapping process to be parallelized and distributed optimally for performance. The mapping agents 110 may reside on a host 140 or elsewhere on the Network.

The system 100 further comprises a controller 120 that is separate from the mapping agents 110. The controller 120 administers and distributes the mapping table 200 to the agents 110. Control of the mapping table 200 is centralized in the controller 120 for optimal cost, management, and other implementation practicalities. The controller 120 further stores the mapping table 200 in a semi-permanent memory, such as a magnetic disk or an EPROM, so that the controller 120 retains the table 200 even after a power loss. In this way, the responsibility for persistent storage of mapping tables 200 lies in the controller 120 so that costs and complexity may be consolidated.

The exact design of the controller 120 is not a subject of this disclosure. Instead, this disclosure focuses on structure of the overall system and the interfaces between the mapping agent 110 and the controller 120. Accordingly, it should be appreciated that any controller, as known in the art of digital information storage, may be employed as needed to implement the present invention. Within this framework, each of the mapping agents 110 preferably interacts only with the controller 120 and not with the other agents 110. Furthermore, the architecture allows for a controller 120 to be comprised of redundant, cooperating physical elements that are able to achieve very high availability. As a result, the system 100 is highly scaleable and tolerant of component failures.

As described below, the interaction of the controller 120 and the agents 110 are defined in terms of functions and return values. In a distributed system 100, as illustrated in FIG. 1A, the communication is implemented with messages on some sort of network transport such as a communication channel 132. The communication channel 132 may employ any type of known data transfer protocol such as TCP/IP. In another implementation, as illustrated in FIG. 1B, the distributed system 100 employs a communication channel 132 that is the storage network 130 itself. Any suitable techniques may be used to translate commands, faults, and responses to network messages. The particular interactions between the functions and activities of the controller 120 are described in greater detail below.

Figure 2:
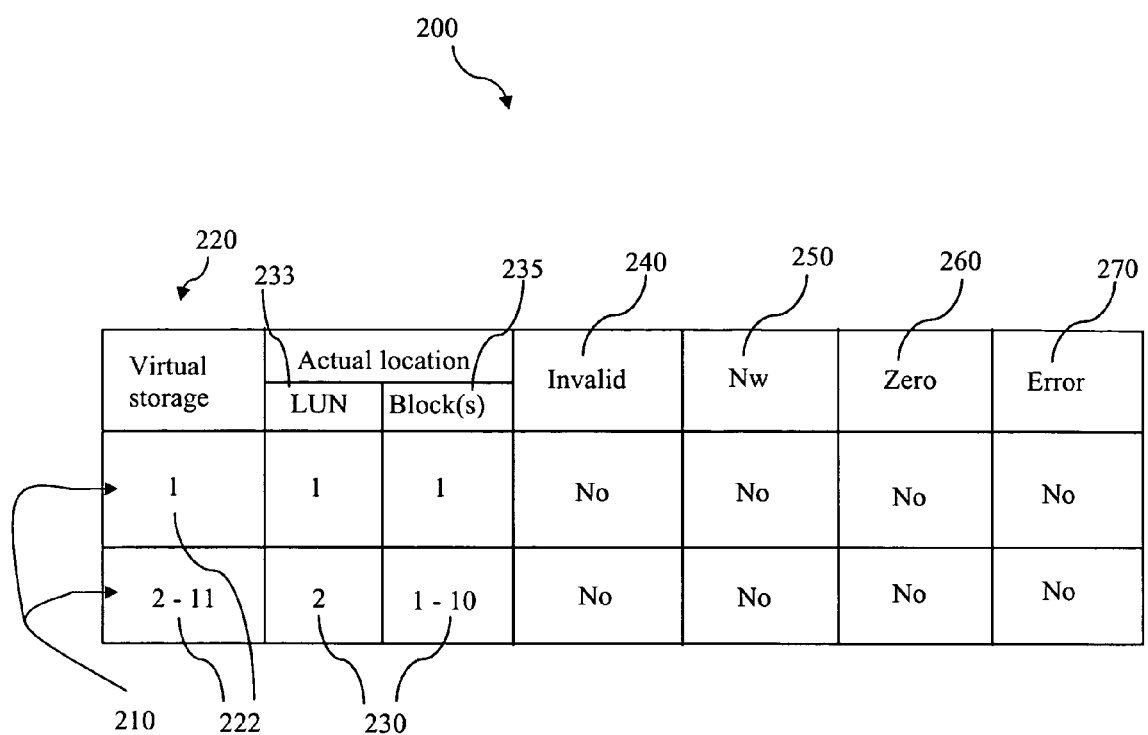
FIG. 2 is an illustration of a table for mapping virtual disk entries to physical storage locations.

FIG. 2 schematically illustrates the contents of the mapping table 200. As described above, the table 200 contains entries 210 (rows) that indicate a mapping between one or more virtual drive segments 222 of a virtual disk 220 and storage locations 230 on the storage devices. The storage locations 230 identify the particular storage device and part of the storage device, which correspond to the virtual disk 150 index. The form for the storage locations 230 must be appropriate for the storage network being used. In a SCSI network, each of the storage locations 230 includes a LUN identifier 233 and a block identifier 235, also called an offset. All of the other fields in a mapping table entry 210 are simple integers or binary state values.

This disclosure describes the mapping table 200 as having one entry 210 per each "disk block" of virtual disk 220. While possible to build, this would result in huge mapping tables and highly fragmented mapping, both of which introduce undesirable performance degradations. In another implementation, each mapping table entry 210 represents a variable sized group of contiguous virtual disk blocks that map to contiguous blocks on one of the physical storage devices. This configuration of the mapping table 200 offers mapping flexibility and dense mapping structures, but introduces greater algorithmic complexity in managing the variable sized blocks and greater map entry lookup costs. Therefore, the table 200 may use mapping table entries 210, each having a fixed size number of contiguous blocks ("segments") on the virtual disk 150 that map to one storage device. While this configuration for the table 200 is possibly not as dense as variable sized block mapping, the configuration offers the simplest and highest performance map access and space management. In this configuration, each of the entries 210 contains a virtual disk segment 222 instead of a virtual disk block. Regardless of the specifics of the table 200, the table 200 must map a virtual drive segment 222 to each physical storage block involved in I/O operations.

In another configuration, the system 100 has multiple tables 200, each having different mappings between a virtual disk 150 and the storage devices. In this way, different hosts 140 may have different access paths to the same storage device. When the mapping table 200 does not include one of the storage locations 230, hosts 140 using this table (i.e., the hosts 140 connect to the agent 110 that stores this table) cannot access information stored at a storage location. In fact, the host 140 will not even realize that this storage location 230 exists.

In addition to mapping information specifying the storage location, each mapping table entry 210 also contains several states. The states are Boolean variables that provide information on the current status of the virtual disk segment and are important because they allow the mapping table 200 stored in the agent 110 to be remotely loaded and manipulated from the controller 120. These states and interfaces provide the ability for the mapping tables to be distributed and for mapping table entries to be volatile.

The disclosure first describes the states prior to explaining some of the functions for the states. The table 200 generally includes at least two states: (1) an invalid state 240 indicating whether any I/O operations may occur on the virtual disk segment 222 and the corresponding physical location 230; and (2) a no-write (Nw) state 250 indicating whether the data contained at the corresponding physical location 230 may be changed. The invalid state 240 and the Nw state 250 are particularly important in allowing dynamic loading of mapping table entries, dynamic mapping changes, volatility of mapping table entries, and data sharing among similar virtual disks 150.

When activated, the invalid state 240 generally indicates that the mapping table entry 210 contains no useable mapping information and cannot support I/O operations. Any attempt to implement an I/O operation through this table entry 210 causes the mapping agent 110 to send a fault message to the controller 120. The agent 110 does not proceed with the I/O operation until the controller 120 returns a fault response.

In one configuration, the system 100 initially activates the invalid state 240 for all entries 210 in the table 200 when the table 200 is newly created. In this way, the table 200 ignores any residual entries in memory from previously stored tables to insure that current entries are active and reliable. Similarly, the invalid state 240 may be activated when entry 210 is 'forgotten' and lost by the agent 110 volatile memory. If the invalid state 240 is activated in the entry 210, then all other values and states in the entry 210 are assumed to contain no valid information and are ignored.

Because the tables 200 located in the mapping agents 110 are volatile, any failure or restart of the mapping agents 110 causes all of the entries 210 to have an active invalid state 240. A sustained loss of communication between the controller 120 and mapping agent 110 also causes I/O operations to stop: either by making all mapping table entries revert to an active invalid state 240 or by adding additional mechanisms to suspend I/O operations until directed by the controller 120 to resume I/O operations. This configuration allows the controller 120 to continue coordinating other mapping agents 110 by indicating that a failed or unreachable mapping agent 110 has been placed into a known state, allowing the controller 120 to provide data access to the surviving mapping agents 110.

As presented above, the Nw state 250, when activated, indicates that any write operations to the virtual disk segment(s) 222 represented by the entry 210 cause the agent 110 to send a fault message the controller 120. The agent 110 does not allow the host 140 to write to the storage locations 230 until the controller 120 returns a fault response to deactivate the Nw state 250. Unlike the invalid state 240, the activated Nw state 250 does not prevent read operations from generating faults. Instead, the agent 110 generally allows the host 140 to proceed to access data at the storage location 230. Accordingly, if only the Nw state is activated, the mapping table entry 210 must contain a useable storage location 230.

In another configuration, the mapping table 200 further includes a zero (Z) state 260. When active, the Z state 260 indicates that the virtual disk segment 222 represented by the entry 210 contains all zero bytes. This feature allows a virtual disk 150 to be created and gives the virtual disk 150 the appearance of being initialized without the need to allocate or adjust any underlying non-virtual storage. If an entry 210 contains an active Z state 260, the agent 110 ignores the storage address 230. If the host 140 attempts to read information stored at storage address 230, the agent 110 returns only zero-filled blocks regardless of the actual contents of the storage address 230. On the other hand, any attempts to write data at the storage address 230 when Z state 260 is activated cause the agent 110 to send a fault message to the controller 120. The agent 110 does not allow the host 140 to write to the storage locations 230 until the controller 120 returns a fault response that deactivates the Z state 260.

In another configuration, the mapping table 200 further includes an error (E) state 270. When active, the E state 270 indicates the existence of an error condition and provides the information necessary to instruct the agent to return an error without disrupting any previous state. The E state 270 is used where a pre-existing failure is known and such failure would cause any attempts at I/O access to fail. It should be noted, however, that the E state 270 could also be used as the means to issue an error status from a mapping fault. If an entry 210 contains an active E state 270, the agent 110 ignores the storage address 230. If the host 140 attempts to read from or write to the storage address 230, the agent 110 returns an error to the host 140.

The interaction of the agent 110 and the controller 120 is now described in greater detail. In one category of interactions, fault/response operations, the agent 110 sends a message to the controller 120 to indicate the occurrence of a fault during an I/O operation to the table 200. Typically, the fault occurs as a result of an activated state, as described above, that prevents the execution of the I/O operation by the agent. The agent 110 sends the fault message to the controller 120. The controller then determines an appropriate action and commands the agent 110 accordingly.

In one type of a fault/response operation, a map fault, the mapping agent 110 alerts the controller 120 that an I/O operation requested by the host 140 cannot be completed because the mapping table entry 210 has an activated state preventing the completion of the requested I/O operation. For example, the mapping agent 110 produces a fault message to the controller in response to any request for an I/O operation to a table entry 210 having an activated invalid flag 240 or in response to an attempt to write to a storage address 230 having an active corresponding Nw flag 250.

The map fault message from the agent 110 generally identifies the requested I/O operation, the virtual disk segment 222 involved, and the table state preventing the I/O operation. After a fault occurs, the agent does not attempt to carry out the I/O operation. Instead, the controller 120 uses the fault message to select the proper response to the faulted I/O operation, (e.g. load map entry, change map entry, delay until some other operation has completed). The controller 120 response informs the mapping agent 110 how to proceed to overcome the cause for the fault.

The controller 120 generally instructs the agent 110 either to resolve the problem or to send an error message to the requesting host 140. When resolving the problem, the controller 120 sends a replacement table entry 210. The agent 110 inserts the new table entry 210 in the table (to replace the former faulty entry) and then retries the I/O operation. If the controller 120 cannot resolve the problem, it instructs the mapping agent 110 to issue an error message to the host 140 and may activate the error state 260 for the table entry 210 causing the fault. As described above, the agent 110 then issues an error message to the host 140 regardless of the other contents of the table entry 210.

Commands to the agent 110 initiated by the controller 120 comprise a second category of interactions: command/response operations. These commands, initiated by the controller 120, include the creation of a new mapping table 200 (new_table) with all entries set to have an activated invalid flag or the deletion of an existing table 200. Additionally, the controller 120 may obtain, from the agent 110, the contents of one of the entries 210 (get_entry) or the status of the one of the states in this entry 210 (get_status). The controller 120 can further order the agent 110 to set all of the contents for one of the entries 210 (set_entry) or the status of one of the states for the entry 210 (set_entry_state).

Once the invalid state 240, the error state 260, or the zero state 270 are active, the controller 120 cannot deactivate the state because, as described above, initial activation of these states voids the storage address 230. To deactivate these states, the controller 120 must instruct the agent 110 to replace the existing entry 210 with an entirely new entry (set_entry). For each command, the agent 110 returns a response to the controller 120 after completing the ordered task.

When the controller 120 instructs the agent to either set or obtain information from the mapping table 200, the system optimally allows the controller 120 to specify multiple, contiguous map table entries 210 in a single command. This allows the agent 110 and the controller 120 to interact more efficiently, with fewer instructions. However, when the controller 120 commands the agent 110 to set either all of the table entries 210 or one of the states for the table entry 210, the controller 120 command to the agent 110 optimally includes a "blocking" flag or state.

During an I/O operation, the presence of the blocking flag in the controller 120 prompts the agent 110 to change the table 200 immediately. The agent 110, however, should not respond to the controller 120 until after the completion of any prior I/O operations initiated before the controller 120 command. In the preferred embodiment, the blocking flag is included in the controller 120 command and applies only to the command containing the blocking flag. Alternatively, although not shown in FIG. 2, the blocking state may be stored with each entry in the table 200 similar to the other states described above.

For a majority of the I/O operations, the mapping agent 110 operates without fault. In non-fault cases, the mapping table entries 210 are valid and do not have any activated states that prevent the requested I/O operation. The virtual disk 150 I/O operations function entirely through the mapping agent 110, allowing the I/O operation to proceed through the mapping table 200 and directly to the physical storage devices without any involvement by the controller 120. As a result, the controller 120 inserts itself into an I/O stream only when needed to perform various management operations and typically does not become involved in non-faulting cases.

Because the controller 120 is typically not involved in the I/O operations, the system 100 has high performance and scalability. Furthermore, the system has a high degree of redundancy as a persistent copy of mapping table 200 for the virtual disk 150 exists on the controller 120, and volatile copies of some or all entries in the mapping table 200 are distributed to one or more mapping agents 110.

This disclosure now describes a process for copying the disk data. The following description generally uses a virtual mapping table 200 that maps physical blocks of fixed size because of its relatively simple management. Therefore, the system 100 generally allows virtual disk 150 data copying to be done on a per-map-entry basis, preferably fixed-sized segments.

Figure 3:
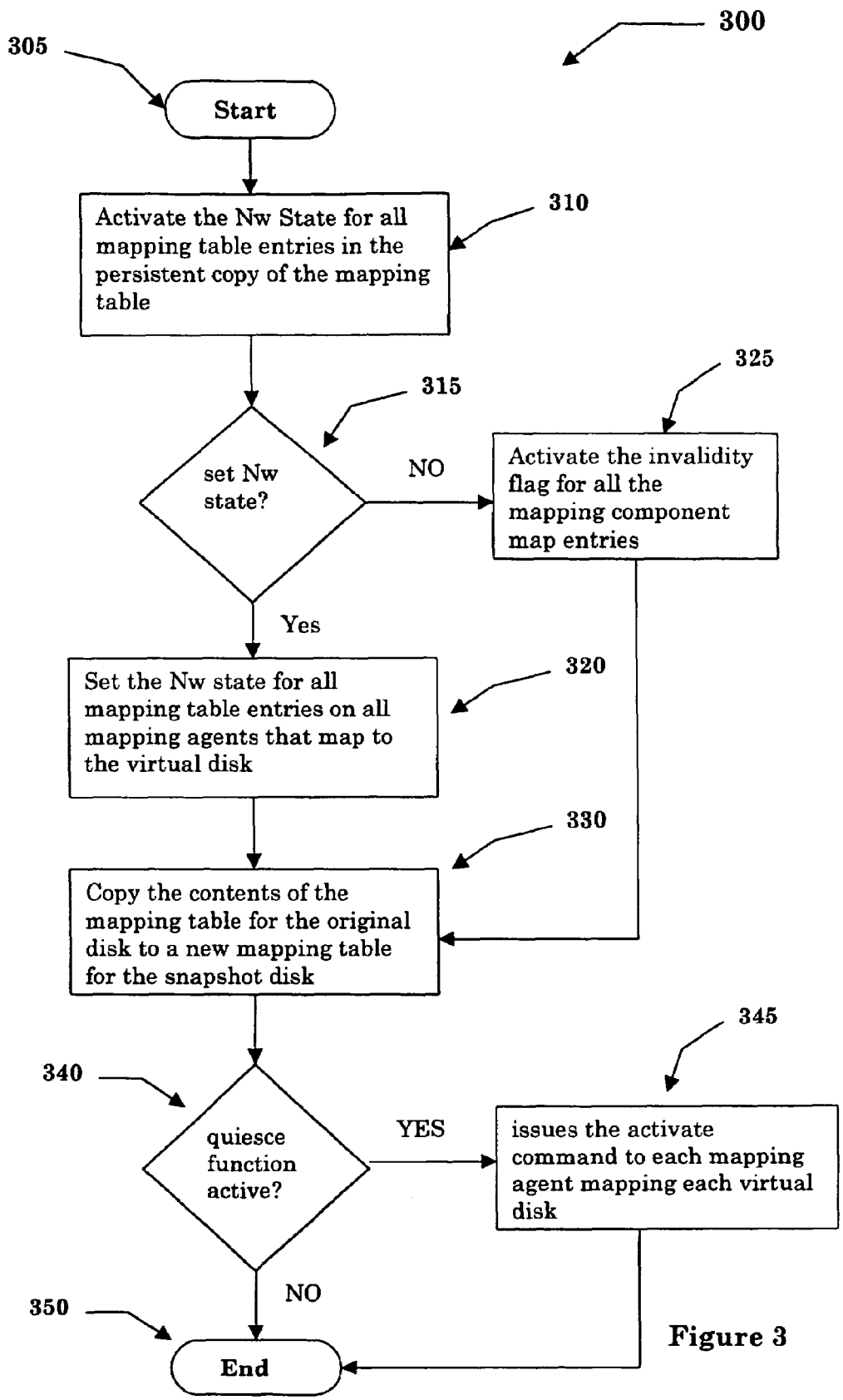
FIG. 3 is a flow chart illustrating the steps in a methodology for copying data in the distributed virtual storage network of FIGS. 1A-B1, in accordance with a preferred embodiment of the present invention.

As illustrated in FIG. 3, in the context of a distributed table-driven virtual storage network, such as the above-described virtual storage system 100, a stored record of the contents of the virtual drive can be preserved by modifying the mapping table 200 to prevent any changes to the table entries 210 or to the data stored in the corresponding storage locations 230. This may be accomplished in table 200 by activating the Nw state 250 for any and all of the table entries 210 that map virtual disk blocks or segments 222 to storage locations 230.

The activation of the Nw state 250 for any and all of the table entries 210 is generally accomplished in the system 100 according to the following description of a virtual disk or snapshot disk creation 300 operation, e.g., creation of a new snapshot disk that generally involves copying the contents of a previously created mapping table but not moving data to allow the new snapshot disk to share the same storage as the original disk, which is space efficient and fast. The disk copy 300 operation begins at step 305. In step 310, the controller 120 activates the Nw state 250 for all mapping table entries 210 in the persistent copy of the mapping table 200 for the original disk. The controller uses a set_entry_state command to communicate this change to all of the mapping agents 110 that map to this virtual disk 150 by setting the Nw state 250 for all mapping table entries 210 in these mapping agents 110, step 320. After this point, all attempts to write to the virtual disk 150 in the table 200 generate mapping faults to the controller 120. Alternatively, if the Nw state is not set, step 315, the controller 120 may activate the invalid flag 240 for all the mapping agent 110 map entries, step 325. The use of invalid flag 240 instead of the Nw flag 250 generates mapping faults for read operations that are otherwise allowed during the period when the Nw state 250 is activated. The key concept is that, at a minimum, all write attempts through the table 200 generate faults.

As described above, the controller 120 set_entry_state signals to the mapping agents 110 to activate the blocking flag that blocks the controller from initiating the table copy until prior I/O operations that were in progress against virtual disk segment 222 at the time of the set_entry_operation have completed. As a result, the mapping agent 110 allows all prior I/O operation to complete prior to responding to the controller 120 and implementing the changes to the Nw state 250. In this way, the controller 120 can know when all outstanding writes to the original disk are completed. The controller 120 then copies the entire contents of the mapping table 200 for the original disk to a new mapping table 200 for the snapshot disk, step 330. This step 330 includes copying the active Nw state 250 for the table entries 210, so that later attempts to write to the snapshot disk containing the copy also generate mapping faults to the controller 120.

At this point, the snapshot disk has been created and all write operations to the original disk or the snapshot disk will cause the mapping agent 110 to generate mapping faults to the controller 120, as described above. If the controller 120 determines that the quiesce function is active, step 340, the controller 120 issues the activate command to each mapping agent 110 mapping each virtual disk 150. Note, the quiesce command and the activate command are explained in detail after the description of FIGS. 5A and 5B, but briefly, the quiesce and activate commands allow the controller 120 to temporarily establish a barrier to queue I/O operations and to restart or activate such I/O operations when a system 100 includes multiple virtual disks 150 to enable data synchronization. The disk copy operation 300 concludes in step 350.

Figure 4:
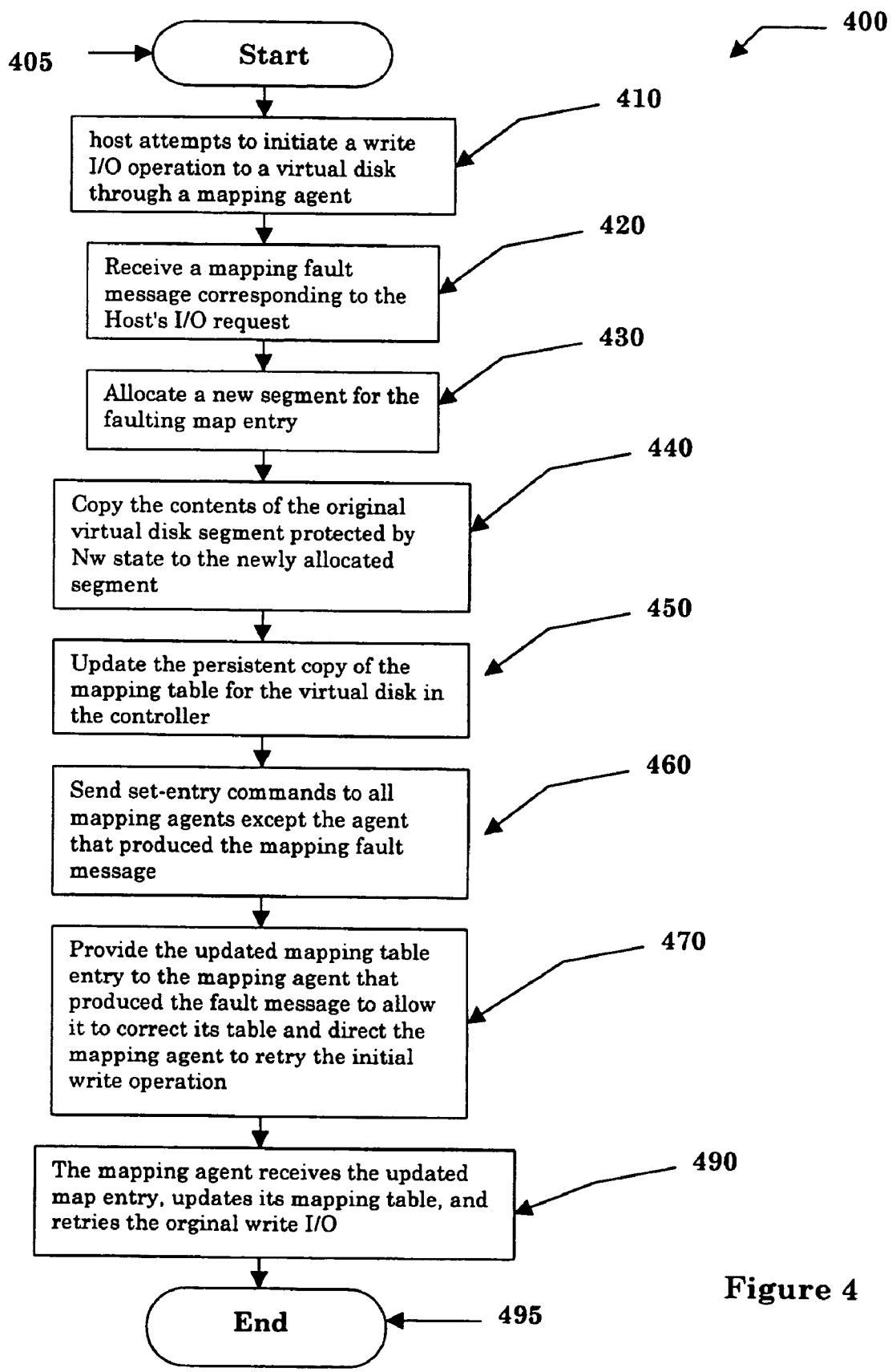
FIG. 4 is a flow chart illustrating the steps in a methodology for the forward-delta process in the distributed virtual storage network of FIGS. 1A-1B, in accordance with a preferred embodiment of the present invention.

As illustrated in FIG. 4, a forward-delta process 400 addresses the mapping fault message caused by an attempt to write to the original disk or the snapshot disk. In the forward-delta process 400, the mapping agent 110 writes new data to newly allocated virtual disk segment while old data is preserved in the original segment. Although the following description assumes that the fault is against the original virtual disk 150, the same process would apply to mapping faults against the new snapshot virtual disk 150.

The forward-delta process 400 is initiated in step 405. In step 410, a host 140 attempts to initiate a write I/O operation to either the new or old virtual disks 150 through a mapping agent 110, causing the agent 110 to encounter an active Nw mapping state 250. As a result, the agent 110 issues a mapping fault message for the write to the controller 120. The controller 120 receives the write fault, step 420, and allocates a new segment for the faulting map entry, step 430. The allocation of a new segment for the faulting map entry in step 430 presumes the availability of free segments on non-virtual storage and an infrastructure in the controller 120 to manage allocation of these free segments. It should be appreciated that the particular mechanism and infrastructure to select and allocate free segments is beyond the scope of this disclosure.

The controller 120 copies the contents of the original virtual disk segment protected by the Nw state 250 to the newly allocated segment, step 440. The controller 120 then updates its persistent copy of the mapping table for the faulting virtual disk 150 so that the faulting segment's Nw state 250 is cleared and the storage location 230 now refers to the newly allocated segment, step 450.

The controller 120 then sends set_entry commands to all mapping agents 110, except the particular agent that produced the mapping fault message in step 410, step 460. In other words, the controller 120 transmits information from its persistently stored copy of the mapping table 200, from step 450. With the exception of the particular agent 110 that produced the mapping fault message in step 410, this information is used to update the volatile copies of the mapping table 200 stored at the mapping agents 110. Specifically, the set_entry command contains the updated mapping table entry that specifies the new location for future write operations.

In step 470, the controller 120 responds to the mapping agent 110 that produced the fault message in step 420. In particular, the controller 120 provides information to fix the mapping agent table 200 with the updated mapping table entry 210 from step 450 and further directs the agent to retry the write operation that caused the initial mapping fault in step 420. The mapping agent 110 then receives the updated map entry 210, updates its mapping table 200, and retries the faulting write I/O, step 490. The forward-delta process concludes at step 495.

Figure 5A:
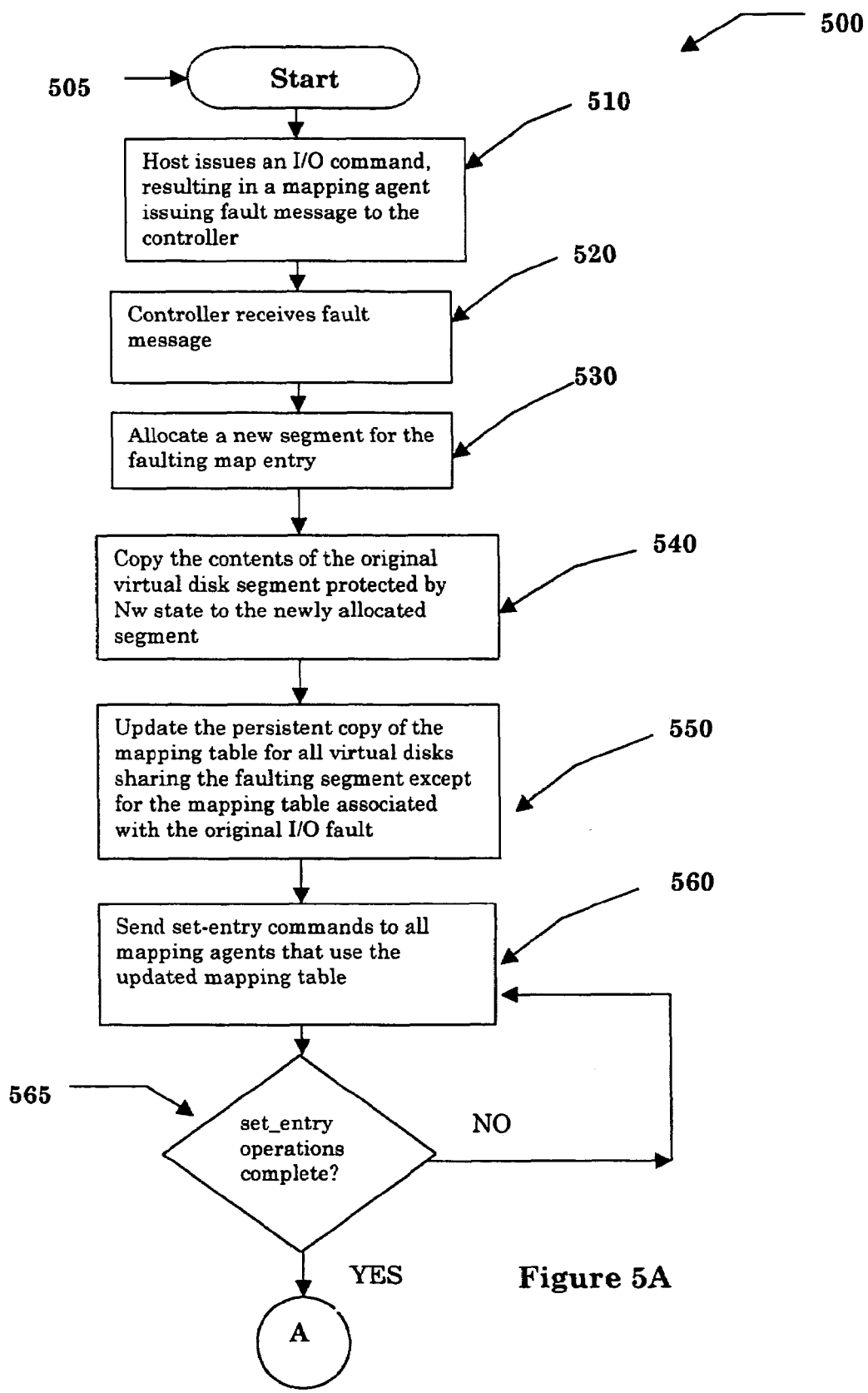
FIGS. 5A and 5B are flow charts illustrating the steps in a methodology for the reverse-delta process in the distributed virtual storage network of FIGS. 1A-1B, in accordance with a preferred embodiment of the present invention.
Figure 5B:
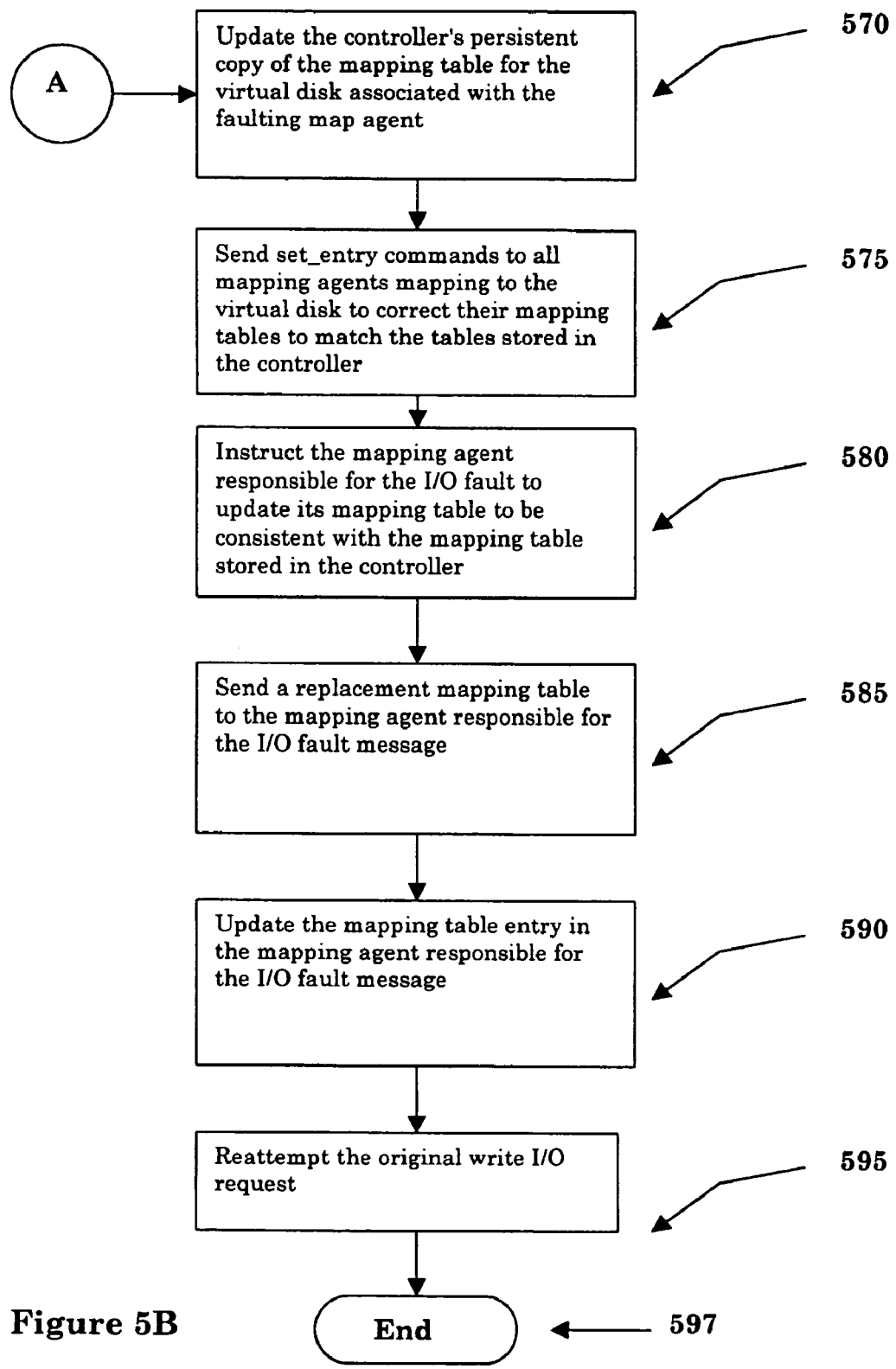

As illustrated in FIGS. 5A-5B, a reverse-delta process 500, an alternative embodiment of the present invention, addresses the write faults caused by the disk copy process 300. The reverse-delta process 500 differs from the above described forward-delta process 400 in that the mapping agent 110 writes new data to the original virtual disk segment while old data is preserved in the newly allocated segment.

The reverse-delta process 500 initiates in step 505 after a host 140 attempts a write I/O operation through one of the mapping agents 110. The agent 110 encounters an activated Nw state 250 and sends to the controller 120 a mapping fault message for the write I/O, step 510. The controller 120 receives the write fault (step 520), allocates a new segment for the faulting map entry 210 (step 530), and copies the contents of the original virtual disk segment 210 protected by activated Nw state to the newly allocated segment, step 540.

The controller 120 then updates its persistent copy of the mapping table 200 for all the virtual disks 150 that share the faulting segment, except for the mapping table that maps the particular virtual disk 150 associated with the I/O fault, step 550. In particular, the controller 120 remaps the virtual disk segments 222 to the newly allocated storage location 230. To update the mapping tables, the controller 120 deactivates the Nw state 250 in the persistently stored table. As part of the step 550, the controller 120 changes the storage location 230 to refer to the newly allocated segment.

In step 560, the control 120 sends set_entry commands to all mapping agents 110 that use the updated mapping table. This action propagates the segment change and the Nw state change to these mapping agents 110. The set entry activates the blocking flag, allowing the controller 120 to know when all outstanding read I/Os to this segment have finished before allowing any writes to proceed to the original segment. The controller 120 waits for these set_entry operations to complete before acting further.

After the mapping agents 110 send a message to the controller 120 indicating the completion of the set_entry operations in the step 560 the controller 120 updates its persistent copy of the mapping table 200 for the virtual disk 150 for the faulting map agent 110, step 570. For this particular mapping, the controller 120 deactivates the Nw state 250 on the faulting entry 210. The segment storage location 230, however, does not change.

The controller then sends set_entry commands to all mapping agents mapping this virtual disk 150, except the faulting mapping agent, to fix their associated mapping tables to match the tables currently stored in the controller 120, step 575. The set_entry command contains the updated mapping table entry from step 570. In step 580, the controller 120 responds to the fault message from step 520 with instructions to update the effected agent table 200 according to the table from step 570. The controller 120 further orders the mapping agent 110 to retry the I/O operation using the new table 200. The faulting mapping agent 110 subsequently receives the replacement table (step 585), updates its mapping table entry 210 (step 590), and retries the faulting write I/O, step 595. At this point, the I/O operation completes because the subject table entry 210 does not contain an activated Nw state 250, step 597.

As can be discerned from the above descriptions, the reverse-delta process 500 involves potentially much more communication with more mapping agents 110 than the forward-delta scheme 400. Therefore, the forward delta process 500 is the preferred implementation of the present invention.

Within distributed, table-driven virtual storage networks, such as the system 100, it is advantageous to allow consistent snapshots across multiple virtual disks 150. There is value in having the ability to create point-in-time, consistent snapshot copies across more than one virtual disk 150. For example, a single database may store its data across multiple virtual disks 150. Snapshots of each of these disks taken at different points in time will result in an inconsistent copy of the overall database. To address this concern, the design for the storage system must support some way to achieve a consistent copying across multiple virtual disks.

This goal may be accomplished through the use of two additional virtual disk 150 commands: quiesce and activate. The quiesce command causes all host 140 I/O operations issued to one of the mapping agents 110 to be queued and delayed in the mapping agent 110 prior to mapping operations in either the forward or reverse delta processes, 400 or 500. A quiesce command must therefore be issued to all maps for all virtual disks for which a consistent snapshot is desired. In effect, the quiesce function puts up a "barrier" to allow multiple I/O streams to be synchronized.

With the quiesce command, the mapping agent 110 does not return a response to the controller 120 setting commands until all I/O operations that were already in progress have completed. The quiesce operation may optionally include a time parameter to provide more error handling opportunities when in-progress I/O operations do not complete in a timely manner—thereby causing the mapping agent 110 to indicate a failure in the command response if the quiesce function lasts longer than the specified time limit. In contrast, the activate function causes all host 140 I/O operations queued by the quiesce function to be released for processing after remapping in either the forward or reverse delta processes, 400 or 500. This operation must be supported by the mapping agents 110, so new command/response messages must be defined to support the quiesce and activate operations.

To use these new commands, the disk copy process 300 is modified to make a consistent copy of a set of multiple virtual disks 150. In particular, in step 305, prior to step 310, for each virtual disk mapping to the consistent set, the controller 120 issues the quiesce command to the mapping agent 110 that maps that virtual disk 150. After all of the virtual disks 150 are quiesced, the steps 310-340 are executed as described above. Upon completion of the steps 310-340 for all virtual disks 150 in the consistent set, the controller issues the activate command to each mapping agent 110 mapping each virtual disk 150, step 345.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for operating a distributed table-driven virtual storage system comprising a controller, a communication channel, a network of one or more hosts operatively connected to said communication channel, one or more agents having volatile memory, and at least one storage container, said method comprising:

the controller creating a mapping table relating a storage location in the at least one storage container to a storage location in a virtual disk representing the at least one storage container;

the controller establishing state variables in said table to indicate conditions favoring or inhibiting certain virtual disk operations;

the controller storing said mapping table in non-volatile memory;

the controller distributing the mapping table to said one or more agents through the communication channel;

said one or more agents storing said distributed mapping table in volatile memory;

each of said one or more agents accessing information stored in the storage container using its distributed mapping table as its index to locate the information;

each of said one or more agents operating independently from all others using its distributed mapping table for I/O access to said at least one storage container.

2. The method of claim 1 wherein:

said one or more agents serve one or more hosts, each respective agent serving a host by conducting data I/O operations through the communication channel.

3. The method of claim 1 wherein:

the mapping table storage location is indicated by mapping virtual disk segments to a device identifier and block identifiers corresponding to said one or more storage containers.

4. The method of claim 1 wherein:

a blocking flag prevents the controller from initiating a table copy operation while I/O operations are in progress against a virtual disk segment.

5. The method of claim 1 wherein:

one of said state variables is an invalid state that indicates whether any I/O operations may occur on a virtual disk segment and the corresponding location in a storage container.

6. The method of claim 1 wherein:

one of said state variables is a no-write state indicating whether data contained in a virtual disk segment's corresponding storage container location may be changed.

7. The method of claim 1 wherein:

one of said state variables is a zero state indicating that a virtual disk segment contains all zero bytes.

8. The method of claim 1 wherein:

one of said state variables is an error state that indicates the existence of an error condition that would cause I/O access to fail.

9. The method of claim 1 further comprising:

the controller maintaining centralized control of the mapping table, its contents, and its distribution to the said one or more agents in the network.

10. The method of claim 1 further comprising:

each of said one or more agents interacting only with the controller for I/O operations serving said agent's respective host.

11. The method of claim 10, wherein:

said fault message from the agent identifies the I/O operation, the virtual disk segment involved, and the table state inhibiting the I/O operation.

12. The method of claim 1 further comprising:

said controller receiving an I/O fault message from one of said agents during an I/O operation to the mapping table, said controller determining the appropriate action and commanding the agent to take the proper action.

* * * * *

UNITED STATES PATENT AND TRADEMARK OFFICE
CERTIFICATE OF CORRECTION

PATENT NO. : 7,366,868 B2 Page 1 of 1
APPLICATION NO. : 11/149850
DATED : April 29, 2008
INVENTOR(S) : James M. Reuter et al.

It is certified that error appears in the above-identified patent and that said Letters Patent is hereby corrected as shown below:

In column 12, line 51, in Claim 9, delete "of" and insert -- or --, therefor.

Signed and Sealed this

Fifth Day of August, 2008

JON W. DUDAS
*Director of the United States Patent and Trademark Office*